June 18, 1957 M. BECKER 2,796,293
LAWN SPRINKLER HEADS
Filed Oct. 20, 1955 3 Sheets-Sheet 1

INVENTOR.
MORRIS BECKER
BY *Clarence E. Ohredy*
HIS ATTORNEY.

June 18, 1957 M. BECKER 2,796,293
LAWN SPRINKLER HEADS
Filed Oct. 20, 1955 3 Sheets-Sheet 2

INVENTOR.
MORRIS BECKER
BY
HIS ATTORNEY.

June 18, 1957 M. BECKER 2,796,293
LAWN SPRINKLER HEADS
Filed Oct. 20, 1955 3 Sheets-Sheet 3

INVENTOR.
MORRIS BECKER
BY *Clarence E. Shrudy*
HIS ATTORNEY.

> United States Patent Office 2,796,293
Patented June 18, 1957

2,796,293

LAWN SPRINKLER HEADS

Morris Becker, Chicago, Ill., assignor to Federal Auto Products Company, Inc., Chicago, Ill., a corporation of Illinois Application October 20, 1955, Serial No. 541,577

5 Claims. (Cl. 299—61)

My invention relates to new and useful improvements in lawn sprinkler heads.

The sprinkler head embodying my invention is especially adaptable for use for sprinkling lawns through the medium of a sprinkler system which is preferably submerged in the ground, leaving only the sprinkler head at ground level at a point where it will not come into contact with the blades of a lawnmower, rake, or the like.

An object of this invention is to provide a sprinkler head of a simplified and improved construction to obtain a maximum spray circle and one wherein the size of the spray circle may be controlled by a simple manual adjustment of the sprinkler head without use of tools or other implements.

Another and equally important object of the invention is to provide a sprinkling head wherein the force of water constantly flushes the head, maintaining the same clean, free from dirt or other debris.

Another object of equal importance is the provision of a sprinkler head wherein when the sprinkler is in action, the spray head of the sprinkler will be projected upwardly to a position above the level of the ground, and when the sprinkler is inactive the spray head will return to its position within the sprinkler, free from contact with the blades of a lawnmower, rake or the like, when the latter is moved over the lawn.

Another object of the invention is to provide a sprinkler head which may be manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
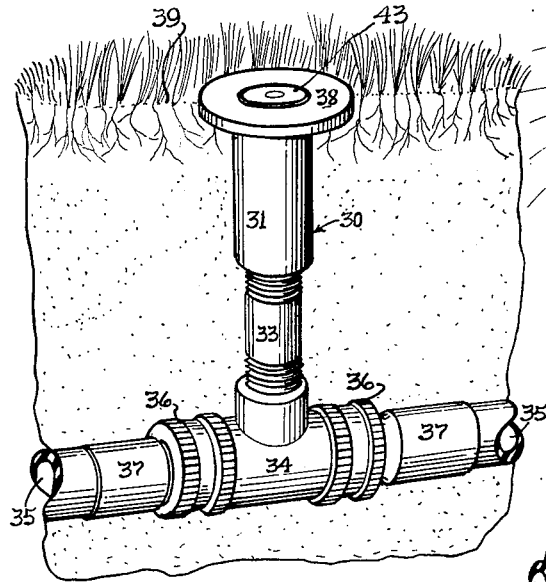
Fig. 1 is a perspective view of my improved sprinkler head showing the same inactive.

The several objects of my invention are preferably accomplished by the forms of construction shown in the accompanying drawings. In this connection and referring particularly to Figs. 1 to 7 inclusive, my improved sprinkling head is indicated generally at 30. This head comprises a tubular shell 31 having at its base a reduced threaded opening 32 for threaded connection with a nipple 33, in turn threaded to a T 34. This T 34 is connected to pipe sections 35 formed of such material as will best serve the purpose. This connection of the T 34 to the pipe sections 35 is accomplished by means of couplers 36 permanently connected as at 37 to the ends of the pipe sections 35.

Figure 2:
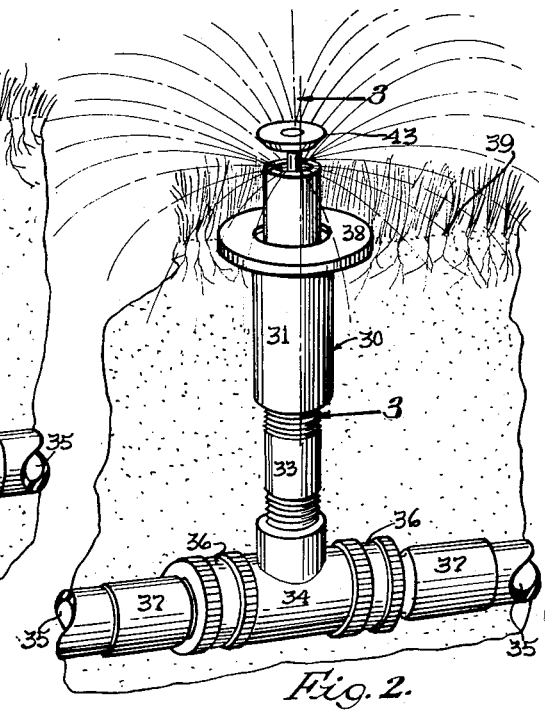
Fig. 2 is a perspective view similar to that shown in Fig. 1 but showing the spray head in projected position.

The shell 31 at its upper end portion has rigidly connected thereto by means of welding or the like a disc 38 which is adapted to be located in contact with the surface 39 of the ground, when the system is submerged therein as shown in Fig. 2.

In the open end portion 40 of the tubular shell 31 is mounted a sleeve 41. This sleeve is pressed into the shell 31 and has a tapered edge 42 which provides a seat for a cap 43 (Fig. 3) preferably in the form of a relatively flat disc having a tapered edge 44 conforming to the tapered edge 42, whereby when the cap 43 is positioned on the sleeve 41, an effective seal will result, preventing dirt and other debris from finding its way into the shell.

Figure 3:
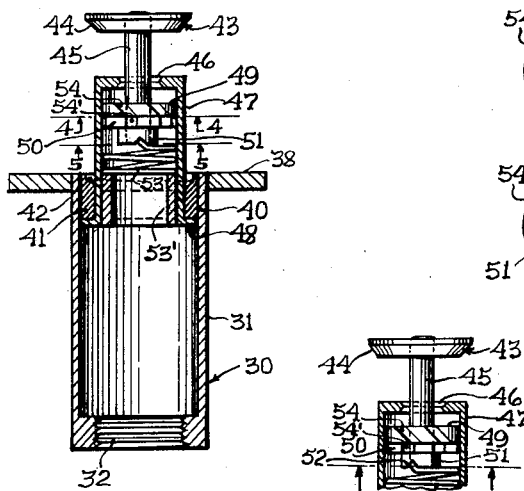
Fig. 3 is a fragmentary sectional detail view taken substantially on line 3—3 of Fig. 2.
Figure 4:
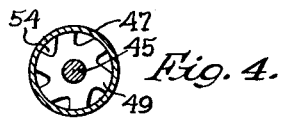
Fig. 4 is a sectional detail view taken substantially on line 4—4 of Fig. 3.
Figure 5:
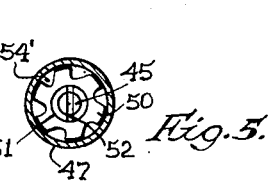
Fig. 5 is a sectional detail view taken substantially on line 5—5 of Fig. 3.

The cap 43 is rigidly secured to a stem 45 which projects through an open end 46 of a tube 47. This tube 47 is slidably related to the sleeve 41 and is provided at its lower end portion with a lateral flange 48 which is of a diameter slightly less than the inside diameter of the shell 31, to permit unobstructed movement of the tube 47 relative to the shell 31. This flange 48 when in engagement with the sleeve 42 as shown in Fig. 3 serves as a seal to prevent the water from passing out of the shell 31 between the sleeve 41 and the tube 47.

The stem 45 has its inner end portion passed through a disc 49 fixed within the tube 47 by pressing the same in the tube. Adjacent its end, the stem 45 has fixedly secured thereto a disc 50. On the end of the stem 45 is fixedly carried a head 51. This head 51 has a transverse groove 52 formed therein. Engaging this groove 52 is one end portion of a spring coil 53, the opposite end portion of the spring coil 53 being yieldably seated upon an insert ring 53' fixedly secured in the tube 47 by means of a drive fit.

Figure 6:
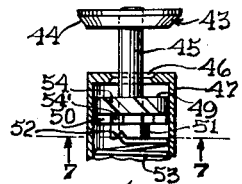
Fig. 6 is a fragmentary sectional detail view of the spray head shown in Fig. 3 but showing the parts thereof in differently adjusted position.
Figure 7:
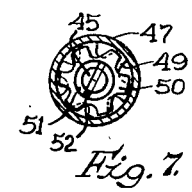
Fig. 7 is a sectional detail view taken substantially on line 7—7 of Fig. 6.

The discs 49 and 50 are each provided with concentrically arranged notches 54 and 54' respectively, which are adapted to be moved into and from registration with each other by the manual rotation of the stem 45, which is accomplished by rotating the cap 43. The notches 54 as shown in Figs. 3 and 6 are diagonal with respect to the opposite sides of the disc 49. The spring coil 53 serves to hold the disc in a predetermined adjusted position.

In use, any number of sprinkling heads of the construction described herein may be employed in a sprinkling system for a lawn, the heads being connected together and located a predetermined distance apart.

When water flows through the pipe sections 35 into the shell 31 the pressure thereof will project the tube 47 from within the shell 31 to the position shown in Figs. 2 and 3. If the discs 49 and 50 are adjusted with their notches 54 and 54' in registration, the maximum spray circle may be obtained, depending upon the degree of water pressure. Should a spray circle of a lesser diameter be desired, by grasping the cap 43 and rotating the stem 45, the registration between the notches 54 and 54' may be reduced. This reduction in the size of the notches will in turn result in a spray circle of a lesser diameter than when the notches are in full registration with respect to each other.

When the water supply is turned off, the tube 47 will drop down into the shell 31 to a position where the cap 43 will be disposed upon the seat 42, the top surface of the cap when in such position being flush with the top surface of the disc 38. When in such position, the cap will not be in contact with or be struck by the blades of a lawnmower, rake, or the like. When the cap is disposed upon its seat 42 of the sleeve 41, there will result a sealing effect which will prevent the admission of dirt or other debris into the shell 31 or between the tube 47 and the sleeve 41.

From the foregoing description it will be evident that I have provided a sprinkling head which comprises relatively few parts; one which may be used with a sprinkling system of a lawn where one or more sprinkling heads are desirable or required. It will also be apparent that my improved sprinkling head includes an arrangement for manually controlling the diameter of the spray circle. This is accomplished by the simple adjustment of the discs 49 and 50 relative to each other.

Figure 8:
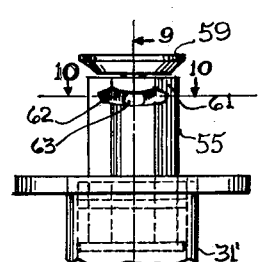
Fig. 8 is a fragmentary elevational view of a sprinkler head showing a modified form of construction.
Figure 9:
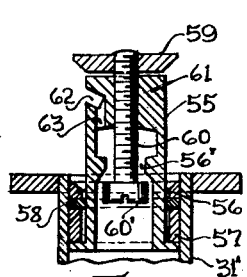
Fig. 9 is a fragmentary sectional detail view of the same taken on line 9—9 of Fig. 8.
Figure 10:
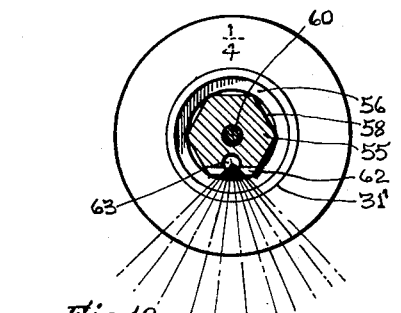
Fig. 10 is a fragmentary sectional detail view taken substantially on line 10—10 of Fig. 8.

In Figs. 8 to 10 inclusive I have shown a modified form of construction of a sprinkling head. In this form of construction a tube 55 is provided for slidable movement between a sleeve construction comprising two ring elements 56 and 57 spaced from each other and fixedly secured within the outer end of the shell 31', which shell is substantially similar to the shell 31 shown in Fig. 3. Between these ring elements 56 and 57 is arranged a washer 58. The tube 55 is preferably hexagonal in cross-section. The openings in the ring elements 56 and 57 are circular while the opening in the washer 58 is hexagonal. The washer element 58 is likewise fixedly secured by means of a press fit within the shell 31'. This washer prevents the tube 55 from rotating within the shell 31' while permitting free slidable vertical movement of the tube 55 relative to the shell 31'.

A cap 59 is secured to the tube 55 by means of a bolt 60 threaded through the closed end portion 61 of the tube 55. The end of this bolt 60 is fixedly secured to the cap 59. The bolt 60 provides a head 60' which serves to restrict the flow of water through the tube 55. To accomplish this there is provided within the tube 55 a restricted passage 56'. By adjusting the head 60' relative to the passage 56' the flow of water through the tube 55 may be regulated to vary the spray area. This adjustment of the head 60' is accomplished by the simple operation of manually rotating the cap 59.

Formed in the closed outer end 61 of the tube 55 is a transverse slot 62 having connection with the tube 55 through a portion 63. The size of this slot 62 is such as will result in producing a quarter spray circle. The sprinkler of this type is desirable where the sprinkling area requires but a quarter of a spray.

Figure 11:
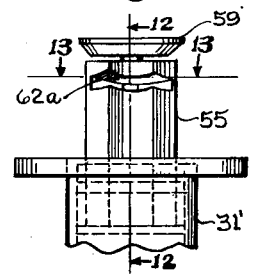
Fig. 11 is a fragmentary elevational view of a sprinkler head similar to that shown in Fig. 8 but showing a modified form of construction.
Figure 12:
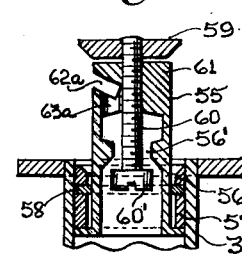
Fig. 12 is a sectional detail view taken substantially on line 12—12 of Fig. 11.
Figure 13:
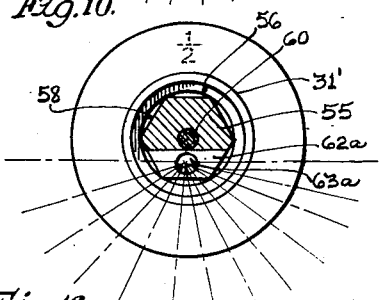
Fig. 13 is a sectional detail view taken substantially on line 13—13 of Fig. 11.
Figure 14:
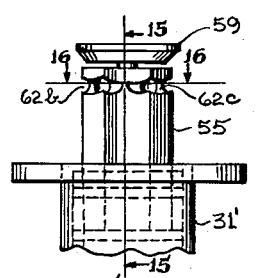
Fig. 14 is a fragmentary elevational view of a sprinkler head similar to that shown in Fig. 11 but showing a modified form of construction.
Figure 15:
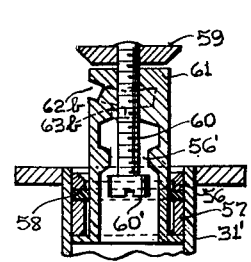
Fig. 15 is a fragmentary sectional detail view taken substantially on line 15—15 of Fig. 14.
Figure 16:
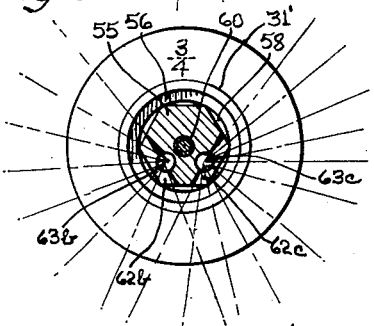
Fig. 16 is a sectional detail view taken substantially on line 16—16 of Fig. 14.
Figure 17:
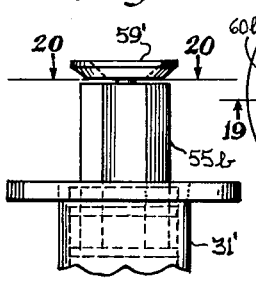
Fig. 17 is a fragmentary side elevational view showing a still modified form of construction over that shown in Figs. 8 to 16 inclusive.
Figure 18:
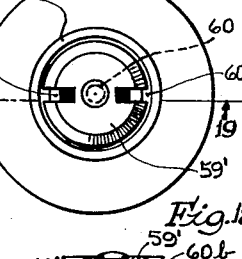
Fig. 18 is a plan view of the sprinkler head shown in Fig. 17.

In Figs. 11 to 13 inclusive I have illustrated a modified form of construction over that shown in Figs. 8 to 10 inclusive. Where the parts in the construction shown in Figs. 11 to 13 are similar to those employed in the construction in Figs. 8 to 10 inclusive, such parts will be indicated by like reference numerals. The differences between the form shown in Figs. 11 to 13 over that shown in Figs. 8 to 10 is the size of the transverse slot. In the form shown in Figs. 11 to 13, the slot 62a is of a size to result in producing a half spray circle. In the form shown in Figs. 14 to 16 there are provided a pair of slots 62b and 62c which together result in producing a three-quarter spray circle. The form of construction of this sprinkling head is otherwise the same as that shown in Figs. 8 to 10 inclusive.

Figures 19, 20:
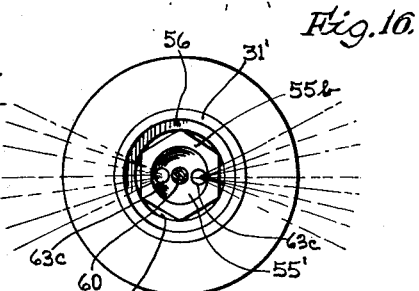
Fig. 19 is a fragmentary sectional detail view taken substantially on line 19—19 of Fig. 18.
Fig. 20 is a sectional detail view taken substantially on line 20—20 of Fig. 17.
Figure 21:
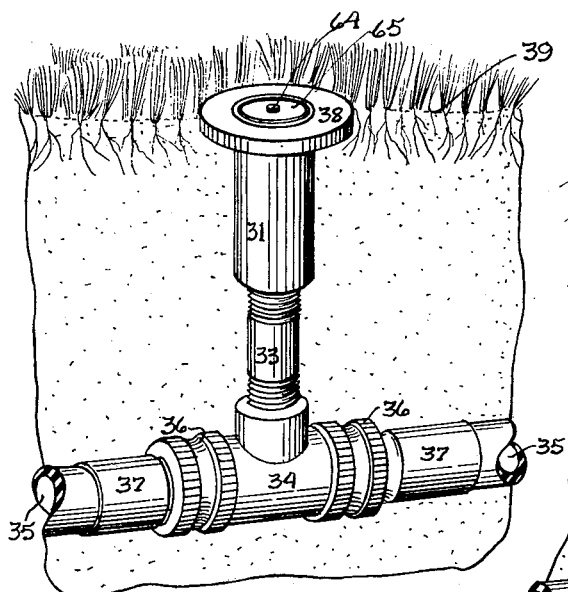
Fig. 21 is a perspective view of a sprinkler similar to that shown in Fig. 1 but showing a modified form of construction.
Figure 22:
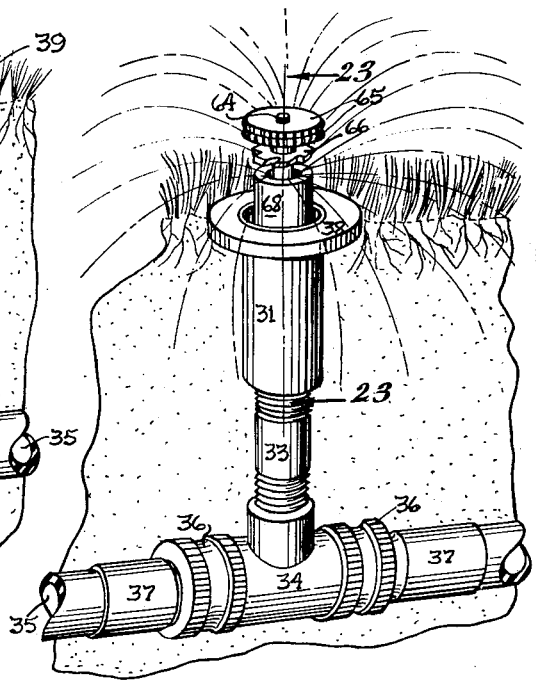
Fig. 22 is a perspective view of the sprinkler head shown in Fig. 21 but showing the latter in action.
Figures 23, 24:
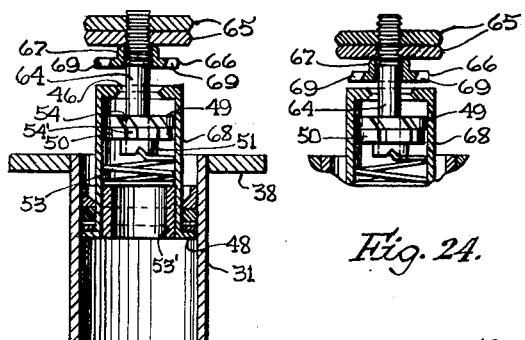
Fig. 23 is a sectional detail view taken substantially on line 23—23 of Fig. 22.
Fig. 24 is a fragmentary sectional detail view similar to that shown in Fig. 23 but showing the parts thereof in different positions.
Figure 25:
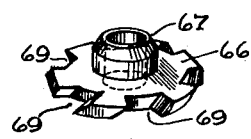
Fig. 25 is a perspective view of a spray disc embodied in the invention.

In the form shown in Figs. 17 to 20 inclusive I have shown a sprinkler which is especially adapted for sprinkling a narrow lawn section. This is accomplished by providing in the cap 59' oppositely disposed notches 60b having communication with the tube 55b through the open top 56' thereof as shown in Fig. 19. In this form of construction the spray from the sprinkler head is in opposite directions, each of a size of approximately a quarter spray circle. In this manner a narrow lawn strip such as parkways or the like may be effectively sprinkled. The form of construction shown in Figs. 17 to 20 other than that pointed out above is substantially the same as that shown in Figs. 8 to 10 inclusive.

In Figs. 21 to 25 inclusive I have embodied my improved sprinkler head in the form of a rotary sprinkler. I accomplish this by threading upon the exterior end portion of the stem 64 a pair of cap discs 65. On the stem 64 I rotatably mount a spray disc 66. This disc provides a hub 67, which rotatably embraces the stem 64. In the peripheral edges of the disc 66 I provide diagonally extending notches 69. The flow of water from the tube 68 passes through these notches 69 and imparts rotation to the spray disc 66, rotating the same about the stem 64, resulting in the rotation of the water spray as it leaves the tube 68. The size of the spray circle by means of the sprinkler head shown in Figs. 21 to 25 may be controlled by adjustment of the lock discs 65. When the spray disc 66 is in close relation with respect to the open end of the tube 68, the rotating spray will be finer and more projected. As this distance is regulated by adjustment of the disc 65, the projection of the rotating spray will be diminished, as well as its fineness.

By forming the notches 54 of the disc 49 diagonally with respect to the sides of the disc, the twirling or rotating effect will be given to the flow of the water, thereby to bring about a self-cleaning action of the spray head, removing any debris or dirt that may be confined within the tube 47 or 68, around the disc 49 or upon the exterior of the spray head. By this arrangement my improved sprinkler head is self-cleaning and non-clogging.

The spray head shown in Figs. 21 to 25 is otherwise constructed similar to the spray head shown in Figs. 1 to 5 inclusive. Similar parts therefore will be described by similar reference characters. From the foregoing description it will be apparent that I have provided a sprinkling head which may be used in a lawn system either as a single unit or one of a plurality of similar sprinkling heads for effectively sprinkling the lawn. The simple manner in which the parts may be adjusted enables the user to regulate the size of the spray circle.

The sprinkling head hereinbefore described by reason of its simplicity in construction may be manufactured at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A sprinkler head comprising a shell, a sleeve fixedly secured in one end of the shell, a tube slidable through the sleeve for telescopical relation with respect to the shell, said tube having a lateral flange engageable with the sleeve when the tube is in projected position with respect to the shell, a stem projecting from the tube, means for mounting the stem to the tube for rotation therewith, a cap carried by the outer end of the stem and adapted to have seated engagement with respect to the sleeve when the tube is positioned within the shell, said mounting means comprising a disc fixed within the tube and through which the stem projects, and a second disc carried by the stem within the tube and rotatable therewith, said discs each having notches formed in their peripheral edges adapted for registration and non-registration with respect to each other by rotation of the stem and through which the fluid flows when said notches of said discs are in registration.

2. A sprinkler head comprising a shell, a sleeve fixedly secured in one end of the shell, a tube slidable through the sleeve for telescopical relation with respect to the shell, said tube having formed therein a restricted passage for the flow of fluid therethrough, said tube having a lateral flange engageable with the sleeve when the tube is in projection position with respect to the shell, a stem projecting from the tube, means for mounting the stem to the tube for rotation therewith, a cap carried by the outer end of the stem and adapted to have seated engagement with respect to the sleeve when the tube is positioned within the shell, said mounting means comprising a disc fixed within the tube and through which the stem projects, a second disc carried by the stem within the tube and rotatable therewith, said discs each having notches formed in their peripheral edges adapted for registration and non-registration with respect to each other by rotation of the stem and through which the fluid flows when said notches of said discs are in registration, said cap when seated upon the sleeve with the tube in the shell providing a closure for the outer open end of the shell.

3. A sprinkler head comprising a shell, a sleeve fixedly secured in one end of the shell, a tube slidable through the sleeve for telescopical relation with respect to the shell, said tube having formed therein a restricted passage for the flow of fluid therethrough, said tube having a lateral flange engageable with the sleeve when the tube is in projected position with respect to the shell, a stem projecting from the tube, means for mounting the stem to the tube for rotation therewith, a cap carried by the outer end of the stem and adapted to have seated engagement with respect to the sleeve when the tube is positioned within the shell, said mounting means comprising a disc fixed within the tube and through which the stem projects, said stem having an enlarged head at one end, a second disc seated on said head in confronting relation to said first mentioned disc and rotatable with said stem, said discs each having notches formed in their peripheral edges adapted for registration and non-registration with respect to each other by rotation of the stem and through which the fluid flows when said notches of said discs are in registration, and a spring member within the tube and engaging the stem to yieldably resist rotation of the stem to move the notches into and from registration with respect to each other.

4. A sprinkler head comprising a shell, a sleeve fixedly secured in one end of the shell, a tube slidable through the sleeve for telescopical relation with respect to the shell, said tube having formed therein a restricted passage for the flow of fluid therethrough, said tube having a lateral flange engageable with the sleeve when the tube is in projected position with respect to the shell, a stem projecting from the tube, means for mounting the stem to the tube for rotation therewith, a cap carried by the outer end of the stem and adapted to have seated engagement with respect to the sleeve when the tube is positioned within the shell, said mounting means comprising a disc fixed within the tube and through which the stem projects, said stem having an enlarged head at one end, a second disc seated on said head in confronting relation to said first mentioned disc and rotatable with said stem, said discs each having notches formed in their peripheral edges adapted for registration and non-registration with respect to each other by rotation of the stem and through which the fluid flows when said notches of said discs are in registration, said cap when seated upon the sleeve with the tube in the shell providing a closure for the outer open end of the shell, and a spring member within the tube and engaging the stem to yieldably resist rotation of the stem to move the notches into and from registration with respect to each other.

5. A sprinkler head comprising a shell, a sleeve fixedly secured in one end of the shell, a tube having formed therein a restricted passage slidable through the sleeve for telescopical relation with respect to the shell, said tube having a lateral flange engageable with the sleeve when the tube is in projected position with respect to the shell, a stem projecting from the tube, means for mounting the stem to the tube for rotation therewith, a cap carried by the outer end of the stem and adapted to have seated engagement with respect to the sleeve when the tube is positioned within the shell, said mounting means including an enlarged head formed at one end of said stem within said tube, and means cooperating with said head for controlling flow of fluid through the restricted passage of said tube, said cap when seated upon the sleeve with the tube in the shell providing a closure for the outer open end of the shell, and a spring member within the tube and engaging the head to yieldably resist rotation of the stem into a position to cooperate with said last named means so as to control the flow of fluid through the restricted passage of said tube.

References Cited in the file of this patent
UNITED STATES PATENTS

| | | |
|---|---|---|
| 1,639,220 | Elder | Aug. 16, 1927 |
| 1,726,490 | Irving et al. | Aug. 27, 1929 |
| 1,821,579 | Rader | Sept. 1, 1931 |
| 1,962,824 | Lindquist et al. | June 12, 1934 |
| 2,668,078 | Snaddy | Feb. 2, 1954 |